United States Patent Office 3,660,466
Patented May 2, 1972

---

3,660,466
2,4,6-TRIIODOBENZOIC ACID DERIVATIVES
Jack Bernstein and Kathryn Alice Losee, New Brunswick, N.J., assignors to E. R. Squibb & Sons, Inc., New York, N.Y.
No Drawing. Filed June 19, 1970, Ser. No. 47,903
Int. Cl. C07c *127/16*
U.S. Cl. 260—471 R    5 Claims

ABSTRACT OF THE DISCLOSURE

Compounds having the formula

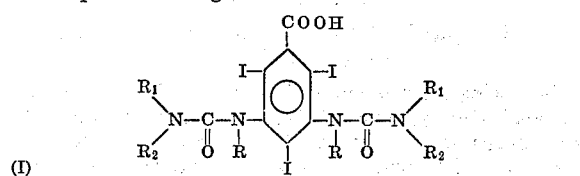

(I)

where R and $R_1$ are hydrogen or lower alkyl, $R_2$ is lower alkyl, as well as salts and lower alkyl esters of these compounds are useful as diagnostic agents.

---

It is an object of the present invention to provide new compounds which are useful radiopaque agents. Another object is to provide methods for the preparation of these compounds. These and other objects of the present invention will be apparent from the following description.

The new compounds of the present invention include the following types of compounds as well as the below-mentioned basic salts and aliphatic esters thereof: 3,5-di-(3-alkylureido)-2,4,6-triiodobenzoic acids such as 3,5-di-(3-methylureido)-2,4,6-triiodobenzoic acid, 3-(3-ethylureido)-5-(3-methylureido)-2,4,6-triiodobenzoic acid and 3,5-di-(3-ethylureido)-2,4,6-triiodobenzoic acid; 3,5-di-(3,3-dialkylureido)-2,4,6-triiodobenzoic acids, such as 3,5-di-(3,3-dimethylureido)-2,4,6-triiodobenzoic acid and 3,5-di-(1,3-dialkyluredio)-2,4,6-triiodobenzoic acid; 3,5 - di- (1,3-dialkyluredio)-2,4,6-triiodobenzoic acids such as 3,5-di-(1-ethyl-3-methylureido)-2,4,6-triiodobenzoic acid and 3,5-di-(1,3-diethylureido)-2,4,6-triiodobenzoic acid; and 3,5-di-(1,3,3-trialkylureido) - 2,4,6 - triiodobenzoic acids, such as 3,5-di-(1-ethyl-3,3-dimethylureido)-2,4,6-triiodobenzoic acid and 3,5-di-(1,3,3-trialkylureido)-2,4,6-triiodobenzoic acid.

Compounds of Formula I are readily prepared by treatment of a compound of the formula

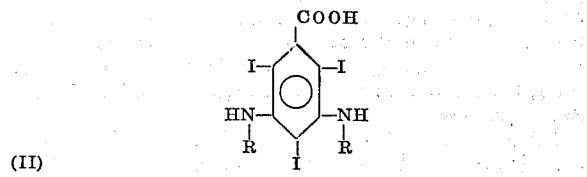

(II)

with an alkyl isocyanate of the formula (iii)    $R_2$—N=C=O or a dialkylcarbamoyl halide of the formula

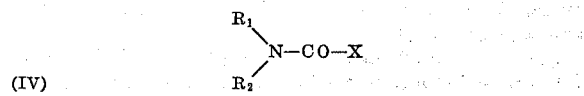

(IV)

wherein X is halogen, preferably chlorine and R, $R_1$ and $R_2$ are as previously defined. The reaction is carried out in an inert solvent such as ethylene glycol dimethyl ether, diethylene glycol dimethyl ether, dimethylformamide.

When a compound of the Formula IV is one of the reactants, the reaction is preferably carried out in the presence of a hydrogen halide acceptor such as pyridine, N-methylmorpholine, triethylamine and the like. In such cases, the hydrogen halide acceptor may also be used a solvent for the reaction.

When unsymmetrically substituted compounds of the Formula I are desired ($R_1$ and $R_2$ in positions 3 and 5 are not identical), the compounds of Formula I may be prepared by treatment of a compound of the formula

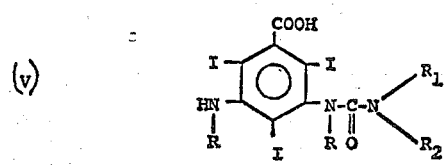

(V)

with a compound of Formula III or IV under the conditions described above.

Compounds of Formula II and Formula V are readily prepared by the iodination of compounds of the Formula VI and VII respectively

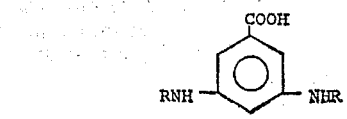

(VI)

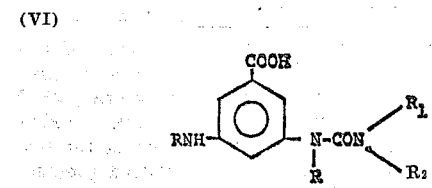

(VII)

Compounds of the Formula VI are prepared by reduction of the corresponding Schiff base. If unsymmetrical intermediates are desired (R groups are not the same), the 5-alkylamino-3-nitrobenzoic acid is converted to the desired 5-(substitted ureido)-3-nitrobenzoic acid, reduced and converted to the 5-(substituted ureido)-3-substituted aminobenzoic acid by reduction of the Schiff base.

The lower alkyl groups R, $R_1$ and $R_2$ include straight or branched alkyl chains of up to 6 carbon atoms such as methyl, ethyl, propyl, i-propyl, n-butyl, i-butyl, n-pentyl, 2-methylbutyl, neopentyl, n-hexyl, 2-methylpentyl, 3-methylpentyl, 2,2-dimethylbutyl, and 2,3-dimethylbutyl. The basic physiologically acceptable salts include alkali metal salts such as, for example, sodium and potassium; alkaline earth salts, such as, for example, calcium; and ammonium salts such as, for example, N-methylglucamine.

The new products of Formula I are useful as radiopaque agents for visualization of animal systems or organs, preferably in the form of physiologically acceptable salts such as sodium or methylglucamine salts for the preparation of solutions for intravascular injection for urography and for vasographic techniques such as angiocardiiography, arteriography, nephrography and venography. The water-insoluble esters are useful in visualizing hollow organs and cavities having external orifices through which the contrast preparation can be introduced in preparation for the examination and removal after the examination is completed. Solutions having about 20 to 50% bound iodine, preferably about 37%, may be used, or on a weight basis from about 20 g. to about 75 g. of a compound of Formula I per 100 ml. of water.

The following examples illustrate the present invention without, however, limiting the same thereto. All temperatures are on the centigrade scale.

EXAMPLE 1

3,5-di-(3-methylureido)-2,4,6-triiodobenzoic acid

A mixture of 2 grams of 3,5-diamino-2,4,6-triiodobenzoic acid, 2 ml. of methyl isocyanate and 100 ml. of ethylene glycol dimethyl ether is heated to reflux for twenty-four hours. The solvent is removed by distillation under reduced pressure and the residue treated with dilute hydrochloric acid. The precipitated solid is filtered, dissolved in dilute alkali and treated with decolorizing carbon. The solution is filtered and acidified with 20% hydrochloric acid, the solid washed with water and dried at 100° under reduced pressure to yield the desired 3,5-di-(3-methylureido)-2,4,6-triiodobenzoic acid.

EXAMPLE 2

3,5-di-(3-ethylureido)-2,4,6-triiodobenzoic acid

Following the procedure of Example 1 but substituting an equivalent amount of ethyl isocyanate for the methyl isocyanate, there is obtained the desired 3,5-di-(3-ethylureido)-2,4,6-triiodobenzoic acid.

EXAMPLE 3

3,5-di-(3-n-butylureido)-2,4,6-triiodobenzoic acid

Following the procedure of Example 1 but substituting an equivalent amount of n-butyl isocyanate for the methyl isocyanate, there is obtained the desired 3,5-di-(3-n-butylureido-2,4,6-triiodobenzoic acid.

EXAMPLE 4

3,5-di-(3,3-dimethylureido)-2,4,6-triiodobenzoic acid

To a stirred mixture of 2 grams of 3,5-diamino-2,4,6-triiodobenzoic acid and 20 ml. of anhydrous benzene there is added dropwise, with cooling, a solution of 2 grams of dimethylcarbamoyl chloride in 15 ml. of anhydrous benzene. The reaction mixture is stirred for two hours and is then concentrated under reduced pressure to remove the benzene. The residue is poured into ice and dilute hydrochloride acid. The precipitated solid is filtered, dissolved in dilute aqueous sodium hydroxide and treated with decolorizing carbon. The solution is filtered and made strongly acid with 20% hydrochloric acid. The solid is filtered, washed with water and dried at 100° under reduced pressure to yield the desired 3,5-di-(3,3-dimethylureido)-2,4,6-triiodobenzoic acid.

EXAMPLE 5

3,5-di-(3,3-diethylureido)-2,4,6-triiodobenzoic acid

Following the procedure of Example 4, but substituting an equivalent amount of diethylcarbamoyl chloride for the dimethylcarbamoyl chloride, there is obtained the desired 3,5 - di - (3,3 - diethylureido)-2,4,6-triiodobenzoic acid.

EXAMPLE 6

3-(3-methylureido)-5-(1,3-dimethyureido)-2,4,6-triiodobenzoic acid (a) 3-amino-5-methylaminobenzoic acid.—A mixture of 9.8 grams of 3-nitro-5-methylaminobenzoic acid and 200 ml. of absolute alcohol, to which has been added 1 gram of 5% palladium on carbon are shaken at 50 p.s.i. of hydrogen in a Parr hydrogenation apparatus until the theoretical quantity of hydrogen is absorbed. The warm reaction mixture is filtered and the filtrate concentrated to dryness under reduced pressure in an atmosphere of nitrogen to yield the desired 3-amino-5-methylaminobenzoic acid.

(b) 3 - amino - 5 - methylamino-2,4,6-triiodobenzoic acid.—To a mixture of 8.2 grams of 3-amino-5-methylaminobenzoic acid and 300 ml. of 15% hydrochloric acid there is added, with vigorous stirring a solution of 30 grams of iodine chloride in 50 ml. of 6 N hydrochloric acid. The reaction mixture is allowed to stir for twenty-four hours and is then diluted with water. The precipitated solid is filtered and dissolved in dilute sodium hydroxide. Sodium bisulfite is added to remove excess iodinating agent and the solution made strongly acid with dilute hydrochloric acid to yield the desired 3-amino-5-methylamino-2,4,6-triiodobenzoic acid. The product may be purified by crystallization from aqueous methanol.

(c) 3 - (3 - methylureido) - 5 - (1,3 - dimethylureido)-2,4,6-triiodobenzoic acid.—Following the procedure of Example 1 but substituting an equivalent amount of 3-amino-5-methylamino-2,4,6-triiodobenzoic acid for the 3,5-diamino-2,4,6-triiodobenzoic acid, there is obtained the desired 3-(3-methylureido) - 5 - (1,3 - dimethylureido)-2,4,6-triiodobenzoic acid.

EXAMPLE 7

3-(3-ethylureido-5-(3-ethyl-1-methylureido)-2,4,6-triiodobenzoic acid

Following the procedure of Example 1 but substituting an equivalent amount of 3-amino-5-methylamino-2,4,6-triiodobenzoic acid for the 3,5-diamino-2,4,6-triiodobenzoic acid and an equivalent amount of ethyl isocyanate for the methyl isocyanate, there is obtained the desired 3-(3 - ethylureido)-5-(3-ethyl - 1 - methylureido - 2,4,6-triiodobenzoic acid.

EXAMPLE 8

3-(3,3-dimethylureido)-5-(1,3,3-trimethylureido)-2,4,6-triiodobenzoic acid

Following the procedure of Example 4, but substituting an equivalent amount of 3-amino-5-methylamino-2,4,6-triiodobenzoic acid for the 3,5-diamino-2,4,6-triiodobenzoic acid, there is obtained the desired 3-(3,3-dimethylureido)-5-(1,3,3-trimethylureido)-2,4,6-triiodobenzoic acid.

EXAMPLE 9

3-(3-methylureido)-5-(3,3-dimethylureido)-2,4,6-triiodobenzoic acid (a) 5 - (3,3 - dimethylureido) - 3 - nitrobenzoic acid.—Following the procedure of Example 4 but substituting an equivalent amount of 5-amino-3-nitrobenzoic acid for the 3,5-diamino-2,4,6-triiodobenzoic acid, there is obtained the desired 5-(3,3-dimethylureido) - 3 - nitrobenzoic acid.

(b) 3-amino-5-(3,3-dimethylureido)-benzoic acid.—To a solution of 15 grams of 5-(3,3-dimethylureido)-3-nitrobenzoic acid in dilute alkali, there is added acetic acid and until the mixture is slightly acidic. To this mixture there is added 2 grams of palladium-on-carbon catalyst and the mixture shaken in a Parr hydrogenation apparatus at 50 p.s.i. pressure of hydrogen until the theoretical quantity of hydrogen is absorbed. The mixture is filtered and acidified with hydrochloric acid to precipitate the desired 3-amino-5-(3,3-dimethylureido)-benzoic acid. The solid is filtered, washed with water and dried at 100° under reduced pressure.

(c) 3 - amino - 5 - (3,3-dimethylureido)-2,4,6-triiodobenzoic acid.—Following the procedure of Example 6(b) but substituting an equivalent amount of 3-amino-5-(3,3-dimethylureido)-benzoic acid for the 3-amino-5-methylaminobenzoic acid and carrying out the reaction at a temperature of about 100° for four hours, there is obtained the desired 3-amino-5-(3,3-dimethylureido)-2,4,6-triiodobenzoic acid.

(d) 3 - (3-methylureido) - 5 - (3,3-dimethylureido)-2,4,6-triiodobenzoic acid.—Following the procedure of Example 1 but substituting an equivalent amount of 3-amino-5-(3,3-dimethylureido)-2,4,6-triiodobenzoic acid for the 3,5-diamino-2,4,6-triiodobenzoic acid, there is obtained the desired 3-(3-methylureido)-5-(3,3-dimethylureido)-2,4,6-triiodobenzoic acid.

EXAMPLE 10

3-(3-n-butylureido)-5-(3,3-dimethylureido)-2,4,6-triiodobenzoic acid

Following the procedure of Example 1 but substituting an equivalent amount of 3-amino-5-(3,3-dimethylureido)-2,4,6-triiodobenzoic acid for the 3,5-diamino-2,4,6-triiodobenzoic acid, and an equivalent amount of n-butyl isocyanate for the methyl isocyanate, there is obtained the desired 3-(3-n-butylureido)-5-(3,3-dimethylureido)-2,4,6-triiodobenzoic acid.

EXAMPLE 11

3-(3-methylureido)-5-(1,3,3-trimethylureido)-2,4,6-triiodobenzoic acid

Following the procedure of Example 9 but substituting and equivalent amount of 5-methylamino-3-nitrobenzoic acid for the 5-amino-3-nitrobenzoic acid, there is obtained the desired 3-(3-methylureido)-5-(1,3,3-trimethylureido)-2,4,6-triiodobenzoic acid.

EXAMPLE 12

3-(3-methylureido)-5-(1-ethyl-3,3-dimethylureido)-2,4,6-triiodobenzoic acid

Following the procedure of Example 9 but substituting an equivalent amount of 5-ethylamino-3-nitrobenzoic acid for the 5-amino-3-nitrobenzoic acid, there is obtained the desired 3-(3-methylureido)-5-(1-ethyl-3,3-dimethylureido)-2,4,6-triiodobenzoic acid.

EXAMPLE 13

3-(3,3-diethylureido)-5-(3,3-dimethylureido)-2,4,6-triiodobenzoic acid

Following the procedure of Example 4 but substituting an equivalent amount of 3-amino-5-(3,3-dimethylureido)-2,4,6-triiodobenzoic acid for the 3,5-diamino-2,4,6-triiodobenzoic acid and an equivalent amount of diethylcarbamoyl chloride for the dimethylcarbamoyl chloride, there is obtained the desired 3-(3,3-diethylureido)-5-(3,3-dimethylureido)-2,4,6-triiodobenzoic acid.

EXAMPLE 14

3-(1,3-dimethylureido)-5-(3,3-dimethylureido)-2,4,6-triiodobenzoic acid (a) 3 - (1,3 - dimethylureido)-5-nitrobenzoic acid.—Following the procedure of Example 1 but substituting an equivanent amount of 3-methylamino-5-nitrobenzoic acid for the 3,5-diamino-2,4,6-triiodobenzoic acid, there is obtained the desired 3-(1,3-dimethylureido)-5-nitrobenzoic acid.

(b) 5 - amino - 3 - (1,3-dimethylureido)-2,4,6-triiodobenzoic acid.—Following the procedure of Examples 9(b) and (c), but substituting an equivalent amount of 3 - (1,3 - dimethylureido)-5-nitrobenzoic acid for the 5-(3,3-dimethylureido)-3-nitrobenzoic acid in Example 9(b), there is obtained the desired 5-amino-3-(1,3-dimethylureido)-2,4,6-triiodobenzoic acid.

(c) 3 - (1,3 - dimethylureido)-5-(3,3-dimethylureido)-2,4,6-triiodobenzoic acid.—Following the procedure of Example 4, but substituting an equivalent amount of 5-amino - 3-(1,3-dimethylureido)-2,4,6-triiodobenzoic acid for the 3,5-diamino-2,4,6-triiodobenzoic acid, there is obtained the desired 3 - (1,3 - dimethylureido) - 5-(3,3-dimethylureido)-2,4,6-triiodobenzoic acid.

EXAMPLE 15

3-(1,3-dimethylureido)-5-(1-ethyl-3-methylureido)-2,4,6-trriodobenzoic acid (a) 3 - (1,3 - dimethylureido)-5-aminobenzoic acid.— Following the procedure of Example 9(b) but substituting an equivalent amount of 3-(1,3-dimethylureido)-5-nitrobenzoic acid for the 5-(3,3-dimethyl)-5-nitrobenzoic acid, there is obtained the desired 3-(1,3-dimethylureido)-5-aminobenzoic acid.

(b) 3 - (1,3 - dimethylureido)-5-ethylaminobenzoic acid.—A mixture of 10 grams of 3-(1,3-dimethylureido)-5-aminobenzoic acid and 4 ml. of acetaldehyde in 200 ml. of absolute ethanol is allowed to stand for 12 hours and is then hydrogenated at room temperature and pressure using 5 grams of Raney nickel as the catalyst. The catalyst is filtered and the solvent removed by distillation under reduced pressure to yield the desired 3-(1,3-dimethylureido)-5-ethylaminobenzoic acid.

(c) 3 - (1,3 - dimethylureido) - 5 - ethylamino-2,4,6-triiodobenzoic acid.—Following the procedure of Example 9(c) but substituting an equivalent amount of 3-(1,3 - dimethylureido)-5-ethylaminobenzoic acid for the 3-amino-5-(3,3-dimethylureido)-benzoic acid, there is obtaind the desired 3-(1,3-dimethylureido)-5-ethylamino-2,4,6-triiodobenzoic acid.

(d) 3 - (1,3 - dimethylureido) - 5-(1-ethyl-3-methylureido)-2,4,6-triiodobenzoic acid.—Following the procedure of Example 1, but substituting an equivalent amount of 3-(1,3-dimethylureido)-5-ethylamino-2,4,6-triiodobenzoic acid for the 3,5-diamino-2,4,6-triiodobenzoic acid, there is obtained the desired 3-(1,3-dimethylureido)-5-(1-ethyl-3-methylureido)-2,4,6-triiodobenzoic acid.

EXAMPLE 16

3-(1,3-dimethylureido)-5-(1-n-butyl-3-methylureido)-2,4,6-triiodobenzoic acid

Following the procedure of Examples 15(b), (c) and (d), but substituting an equivalent amount of n-butyraldehyde for the acetaldehyde in Example 15(b), there is obtained the desired 3-(1,3-dimethylureido)-5-(1-n-butyl-3-methylureido)-2,4,6-triiodobenzoic acid.

EXAMPLE 17

3-(1,3-dimethylureido)-5-(1-ethyl-3,3-dimethylureido)-2,4,6-triiodobenzoic acid

Following the procedure of Example 4, but substituting an equivalent amount of 3-(1,3-dimethylureido)-5-ethylamino-2,4,6-triiodobenzoic acid for the 3,5-diamino-2,4,6-triiodobenzoic acid, there is obtained the desired 3-(1,3-dimethylureido) - 5 - (1 - ethyl-3,3-dimethylureido)-2,4,6-triiodobenzoic acid.

EXAMPLE 18

3-(1,3,3-trimethylureido)-5-(1-ethyl-3,3-dimethylureido)-2,4,6-triiodobenzoic acid (a) 3 - (1,3,3-trimethylureido)-5-nitrobenzoic acid.— Following the procedure of Example 4, but substituting an equivalent amount of 3-methylamino-5-nitrobenzoic acid for the 3,5-diamino-2,4,6-triiodobenzoic acid, there is obtained the desired 3 - (1,3,3-trimethylureido)-5-nitrobenzoic acid.

(b) 3 - (1,3,3 - trimethylureido) - 5 - (1-ethyl-3,3-dimethylureido) - 2,4,6-triiodobenzoic acid.—Following the procedure of Examples 14(b) and (c) but substituting an equivalent amount of 3-(1,3,3-trimethylureido)-5-nitrobenzoic acid for the 3-(1,3-dimethylureido)-5-nitrobenzoic acid in Example 15(b), there is obtained the desired 3-(1,3,3-trimethylureido)-5-(1-ethyl-3,3-dimethylureido-2,4,6-triiodobenzoic acid.

EXAMPLE 19

3,5-di-(1-ethyl-3,3-dimethylureido)-2,4-6-triiodobenzoic acid (a) 3,5 - di-ethylaminobenzoic acid.—Following the procedure of Example 15(b) but substituting an equivalent amount of 3,5-diaminobenzoic acid for the 3-(1,3-dimethylureido)-5-aminobenzoic acid, there is obtained the desired 3,5-di-ethylaminobenzoic acid.

(b) 3,5 - di - ethylamino - 2,4,6-triiodobenzoic acid.— Following the procedure of Example 6(b), but substituting an equivalent amount of 3,5-di-ethylamino-benzoic acid for the 3-amino-5-methylaminobenzoic acid, there is obtained the desired, 3,5-diethylamino-2,4,6-triiodobenzoic acid.

(c) 3,5 - di-(1-ethyl-3,3-dimethylureido)-2,4,6-triiodobenzoic acid.—Following the procedure of Example 4 but substituting an equivalent amount of 3,5-di-ethylamino-2,4,6-triiodobenzoic acid for the 3,5-diamino-2,4,6-triiodobenzoic acid, there is obtained the desired 3,5-di-(1-ethyl-3,3-dimethylureido)-2,4,6-triiodobenzoic acid.

EXAMPLE 20

3,5-di-(1-ethyl-3-methylureido)-2,4,6-triiodobenzoic acid

Following the procedure of Example 1, but substituting an equivalent amount of 3,5-di-ethylamino-2,4,6-triiodobenzoic acid for 3,5-diamino-2,4,6-triiodobenzoic acid, there is obtained the desired 3,5-di-(1-ethyl-3-methylureido)-2,4,6-triiodobenzoic acid.

EXAMPLE 21

Ethyl 3,5-di-(3-methylureido)-2,4,6-triiodobenzoate

To a stirred slurry of 21.2 grams of 3,5-di-(3- methylureido)-2,4,6-triiodobenzoic acid in 75 ml. of absolute ethanol there is added a solution of 2.2 grams of potassium hydroxide in 50 ml. of absolute ethanol. There is then added 4.5 ml. of diethyl sulfate and the reaction mixture stirred for twenty-four hours. To this mixture there is then added 100 ml. of water and the mixture concentrated to dryness. The residue is suspended in dilute sodium hydroxide solution, filtered, washed with water and dried to yield the desired ethyl 3,5-di-(3-methylureido)-2,4,6-triiodobenzoate. The product may be purified by solution in hot dimethylformamide, treatment with decolorizing carbon and dilution of the filtrate with water to precipitate the ester.

What is claimed is:
1. A compound of the formula

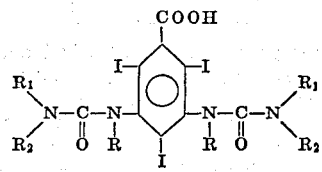

wherein R and $R_1$ are hydrogen or lower alkyl of up to 6 carbon atoms, $R_2$ is lower alkyl of up to 6 carbon atoms, and lower alkyl esters and physiologically acceptable salts thereof, wherein the lower alkyl ester has up to 6 carbon atoms.

2. A compound of claim 1 wherein R and $R_1$ are hydrogen.

3. A compound of claim 1 wherein R and $R_1$ are lower alkyl.

4. A compound of claim 1 wherein one R is hydrogen and the other $R_1$ is lower alkyl.

5. A compound of claim 1 wherein one $R_1$ is hydrogen and the other $R_1$ is lower alkyl.

References Cited

Fieser, L. F. et al. Organic Chemistry, 3rd Edition (1956), Published by Reinhold Pub. Corp. (N.Y.), p. 608 cited.

LORRAINE A. WEINBERGER, Primary Examiner

L. THAXTON, Assistant Examiner

U.S. Cl. X.R.

260—501.11; 518 A; 424—5

Disclaimer and Dedication 3,660,466.—*Jack Bernstein*, and *Kathryn Alice Losee*, New Brunswick, N.J. 2,4,6-TRIIODOBENZOIC ACID DERIVATIVES. Patent dated May 2, 1972. Disclaimer and dedication filed June 29, 1972, by the inventors; the assignee, *E. R. Squibb & Sons, Inc.*, assenting.

Hereby disclaims and dedicates to the Public claims 1, 3 and 5 of said patent.

[*Official Gazette September 19, 1972.*]

PO-1050
(5/69)

UNITED STATES PATENT OFFICE
CERTIFICATE OF CORRECTION

Patent No. 3,660,466   Dated   May 2, 1972

Inventor(s) Jack Bernstein and Kathryn Alice Losee

It is certified that error appears in the above-identified patent and that said Letters Patent are hereby corrected as shown below:

Column 1, line 40, "(1,3-dialkylureido)" should read - - di-(3,3-diethylureido) - -; and on line 41, "dialkyluredio" should read - - dialkylureido - -. Column 2, line 5, after "used" should be inserted - - as - -; and on line 61, "cardiiography," should read - - cardiography - -. Column 8, line 20, "$R_1$" should read - - R - -.

Signed and sealed this 27th day of March 1973.

(SEAL)
Attest:

EDWARD M. FLETCHER, JR.
Attesting Officer

ROBERT GOTTSCHALK
Commissioner of Patents